(12) United States Patent
Quinting

(10) Patent No.: US 12,241,524 B2
(45) Date of Patent: Mar. 4, 2025

(54) BLOCK LOCK WITH SHORT LOCKING DISTANCE

(71) Applicant: THIELE GMBH & CO. KG, Iserlohn (DE)

(72) Inventor: Janis Quinting, Menden (DE)

(73) Assignee: THIELE GMBH & CO. KG, Iserlohn (DE)

( * ) Notice: Subject to any disclaimer, the term of this patent is extended or adjusted under 35 U.S.C. 154(b) by 246 days.

(21) Appl. No.: 17/631,131

(22) PCT Filed: May 8, 2020

(86) PCT No.: PCT/DE2020/100389
§ 371 (c)(1),
(2) Date: Jan. 28, 2022

(87) PCT Pub. No.: WO2021/018335
PCT Pub. Date: Feb. 4, 2021

(65) Prior Publication Data
US 2022/0260134 A1    Aug. 18, 2022

(30) Foreign Application Priority Data

Jul. 29, 2019  (DE) ...................... 20 2019 104 16.3

(51) Int. Cl.
*F16G 15/04*      (2006.01)
*F16G 15/02*      (2006.01)

(52) U.S. Cl.
CPC ............. *F16G 15/04* (2013.01); *F16G 15/02* (2013.01)

(58) Field of Classification Search
CPC .................................. F16G 15/04; F16G 15/02
See application file for complete search history.

(56) References Cited

U.S. PATENT DOCUMENTS

| | | | |
|---|---|---|---|
| 7,263,821 B2* | 9/2007 | Nuding | F16G 15/02 59/84 |
| 10,344,824 B2 | 7/2019 | Brodziak | |
| 10,859,135 B2 | 12/2020 | Stukenburg et al. | |
| 2006/0266015 A1 | 11/2006 | Nuding et al. | |
| 2021/0239184 A1* | 8/2021 | Stukenberg | F16G 15/02 |

FOREIGN PATENT DOCUMENTS

| | | | | |
|---|---|---|---|---|
| DE | 1815409 A1 | 6/1970 | | |
| DE | 20008845 U1 | 8/2000 | | |
| DE | 102014103981 B3 * | 6/2015 | ............ | F16G 15/04 |

(Continued)

OTHER PUBLICATIONS

English translate (DE102014103981B3), retrieved date Jan. 6, 2024.*

(Continued)

*Primary Examiner* — Mohammed S. Alawadi
(74) *Attorney, Agent, or Firm* — HAUPTMAN HAM, LLP

(57) ABSTRACT

A block lock for connecting two chain ends, wherein, in the locked state, the block lock has two oppositely located block-lock halves which extend in the longitudinal direction, interengage in a form-fitting manner via a respective stub and stub socket and lock to form at least one accommodating opening, preferably two accommodating openings, for accommodating a chain link. The block-lock halves interengage in a comb-like manner at their ends.

12 Claims, 4 Drawing Sheets

(56) References Cited

FOREIGN PATENT DOCUMENTS

| DE | 102015117860 A1 | 4/2017 |
| DE | 102016108051 A1 | 11/2017 |
| WO | 2004097253 A1 | 11/2004 |

OTHER PUBLICATIONS

Office Action for Chinese Application No. 202080053604.6 mailed May 7, 2022; 13pp.
International Preliminary Report for International Application No. PCT/DE2020/100389 mailed Oct. 20, 2021; 19pp.
International Search Report of International Application No. PCT/DE2020/100389 mailed Jul. 21, 2020; 16pp.

* cited by examiner

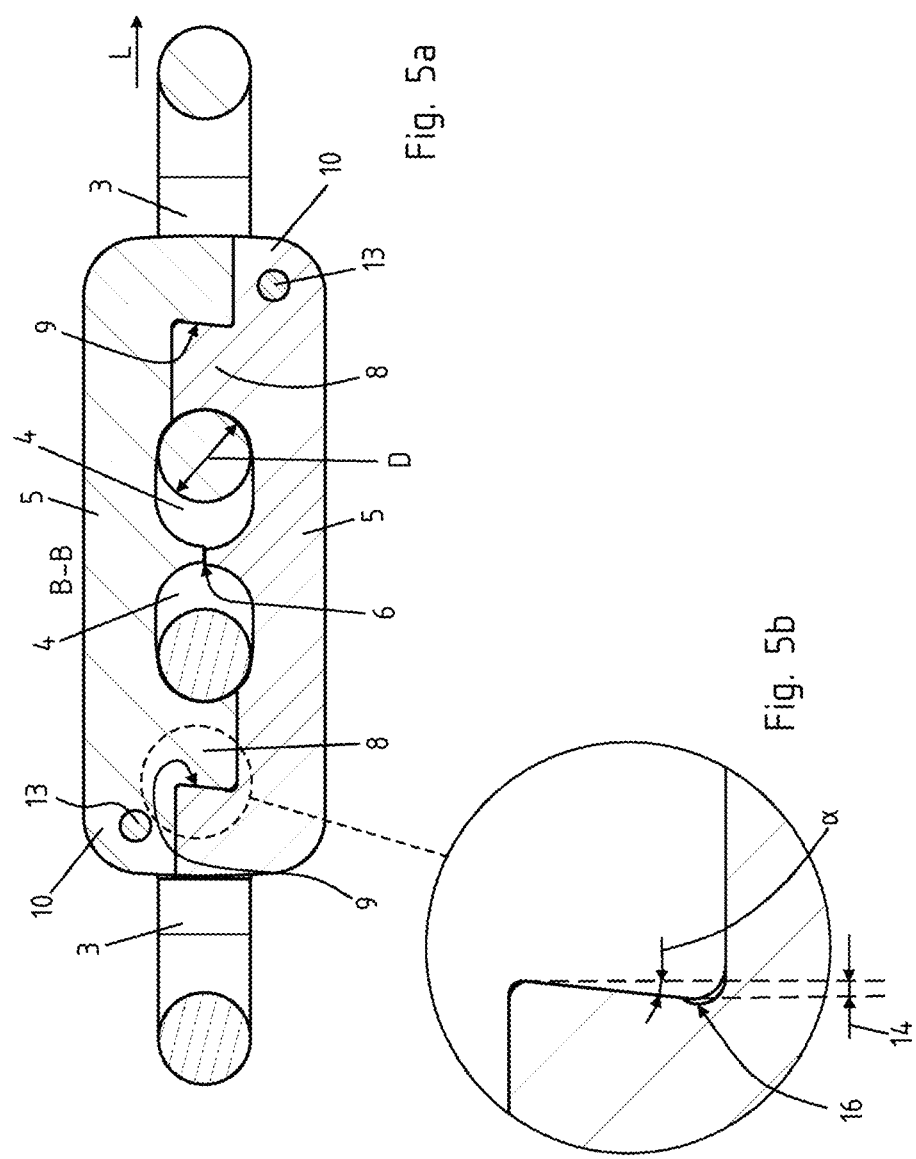

BLOCK LOCK WITH SHORT LOCKING DISTANCE

RELATED APPLICATION(S)

The present application is a National Phase of International Application Number PCT/DE2020/100389 filed May 8, 2020 and claims priority of German Application Number 20 2019 104 163.3 filed Jul. 29, 2019.

FIELD

The present disclosure relates to a block lock for connecting two chain ends.

BACKGROUND

Blocks locks are for connecting the ends of two chains to one another. Such block locks are used in the mining industry and in conveying technology, where chains run in so-called chain conveyors. For maintenance work and in order to change over the chain or the like, to unlock and/or lock a block lock within the channel of the chain conveyor is necessary.

Block locks of the type in question are known, for example, from DE 10 2010 034 394 A1 or DE 20 2006 006 731 U1.

Such a block lock comprises two block-lock halves which are designed to be mirror-symmetrical or complementary in relation to one another and are placed one inside the other for locking purposes.

SUMMARY

The object of the present disclosure is to develop such a block lock that has a shorter locking distance.

The aforementioned object is achieved according to the disclosure by a block lock for connecting two chain ends.

The block lock according to the disclosure for connecting two chain ends has two oppositely located block-lock halves which each extend in the longitudinal direction. The two block-lock halves here interengage in a form-fitting manner so as to lock the block lock. For this purpose, a stub is present in a region of one respective end, and a stub socket is present in the region of the other end, of the respective block-lock half. If the two block-lock halves are therefore locked to one another, the respective stub of one block-lock half engages in the stub socket of the other block-lock half. At least one accommodating opening is, two accommodating openings are, formed between the two block-lock halves, wherein a respective chain link of the chain end is accommodated in the accommodating opening or in the respective accommodating opening.

According to the disclosure, the block lock is distinguished, then, in that there is no projecting protrusion with an additional protuberance or the like formed on the block-lock halves. In contrast, according to the disclosure, the ends of the block-lock halves interengage in a comb-like manner. The comb direction of the comb-like interengagement here is formed in the longitudinal direction of the block-lock halves.

In the locked state, the engagement and thus the transmission of tensile force in the longitudinal direction is achieved by the respective stub and the stub socket. In order to allow the block lock to be locked in the first instance, however, the locking distance in the longitudinal direction is exclusively defined by the stub and the stub socket and not by additional projections, protrusions and/or protuberances. Overall, this is able to therefore achieve a considerable reduction in the locking distance in the longitudinal direction, while at the same time providing for a highly reliable locking state and also transmission of the tensile force in the longitudinal direction of the chain or longitudinal direction of the block lock. Therefore, in the first instance, the block-lock halves are able to be placed one inside the other in the direction transverse to the longitudinal direction. This results in the ends already meshing one inside the other at least to some extent. This is followed by movement over a displacement distance or locking distance in the longitudinal direction, and therefore the stub and stub socket come into engagement with one another in a form-fitting manner. This displacement distance in the longitudinal direction is smaller than 10%, smaller than 8% and smaller than 6%, in relation to the diameter of a corresponding chain link. The diameter relates to the diameter which the chain link has in its rounded portion. The chain here is a round-steel link chain. The displacement path, however, should be greater than 0.5%, greater than 1%, of the diameter. The diameters are usually given in millimeters. The displacement distance is then the percentage of this diameter in millimeters.

In order to achieve the comb-like interengagement, an extended portion is arranged at one end of each block-lock half. The extended portion is designed in the form of at least two, three, comb-like fork extensions. This extended portion is arranged beneath the stub. The extended portion extends in the longitudinal direction in relation to the stub.

An extension is formed, or two extensions are formed parallel one beside the other, at the other free end of the block-lock half. The extensions are arranged behind the stub socket, as seen in the longitudinal direction, and project in relation to the stub socket in a direction transverse to the longitudinal direction.

If the two block-lock halves are then brought into engagement with one another, the extensions and fork extensions interengage with meshing action.

The extensions and fork extensions are designed, such that, when the block-lock halves have been fully locked, the respective longitudinal-section surface there of each is identical to the other.

A respective locking means is able to be arranged so as to engage through the intermeshing extensions and fork extensions. This locking means is in the form of a fitting pin or locking pin. The locking means is arranged in a direction transverse to the longitudinal direction, with engagement through the extensions and fork extensions.

This is able to therefore result in a block lock which has a short locking distance in the longitudinal direction. The stub has a slope, which is arranged at an angle of between 4 to 8, between 5 to 7 and approximately degrees to an orthogonal in relation to the longitudinal direction. The stub therefore engages in the stub socket, which has a complementary slope. This slop ensures that, in the locked state, the two block-lock halves, when subjected to a tensile force, do not become detached from one another in a direction transverse to the longitudinal direction. The slope also ensures that the two block-lock halves, when subjected to a tensile force in the longitudinal direction, would push toward one another in a direction transverse to the longitudinal direction.

The locking distance in the longitudinal direction is therefore, critically exclusively defined by the offset created by the slope of the stub.

Overall, the block lock is therefore improved in relation to the block-lock halves since a short locking distance is made possible, and this renders handling in a chain-strand channel considerably easier for a relevant technician.

BRIEF DESCRIPTION OF THE DRAWINGS

Further embodiments, features, properties and aspects of the present disclosure form the subject matter of the following description. Further embodiments are illustrated in the schematic figures, in which:

FIG. 5A shows a longitudinal-section view of the block lock taken along B-B from FIG. 4 according to disclosure, and FIG. 5B shows a detail-specific view of FIG. 5A according to disclosure.

DETAILED DESCRIPTION

The same or like components are denoted by the same reference lines in the figures, even if, in order to simplify matters, there is not repeated description of these components.

Figure 1:
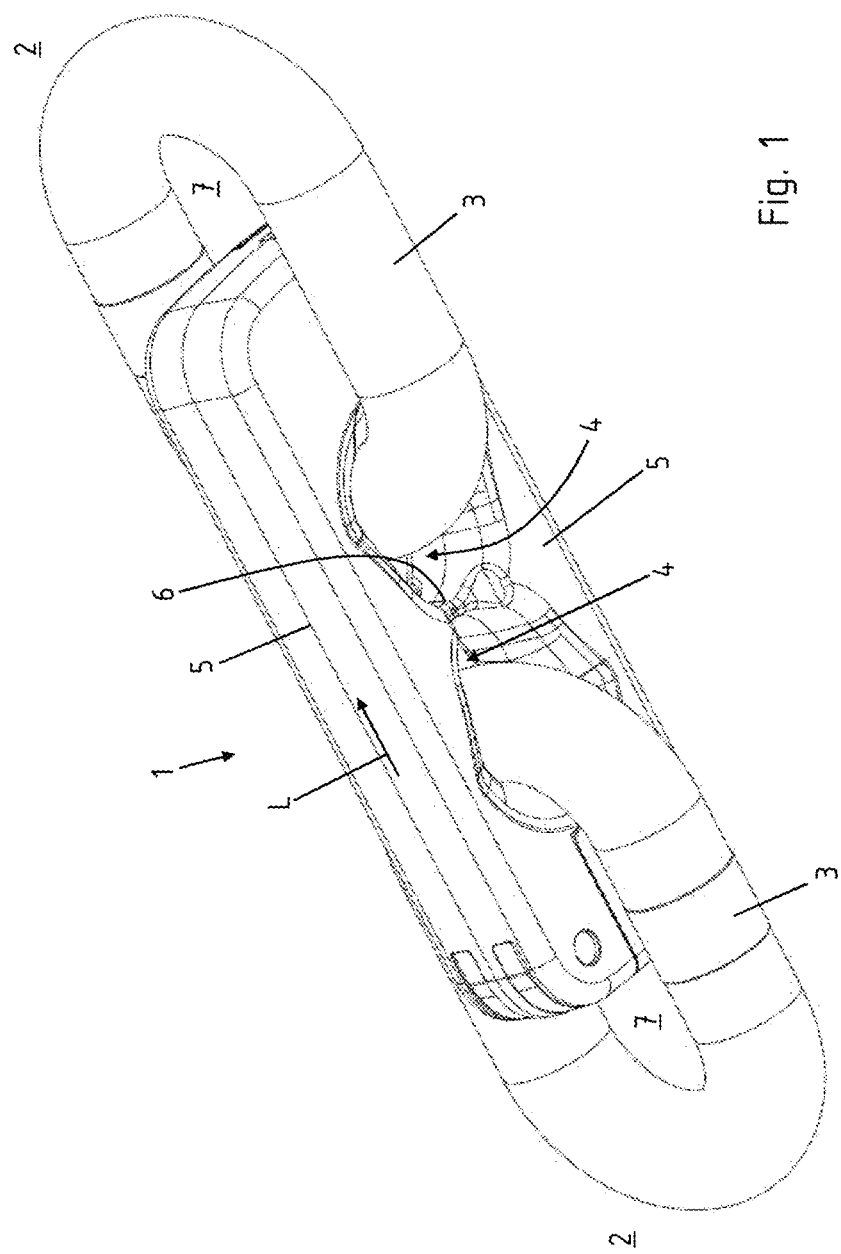
FIG. 1 shows a perspective view of a block lock according to the disclosure along with two chain ends.

FIG. 1 shows a block lock 1 according to the disclosure for connecting two chain ends 2. A respective chain end 2 is illustrated by a horizontally located chain link 3. The respective chain link 3 is accommodated in an accommodated opening 4 in the block lock 1. The block lock 1 itself is formed by two block-lock halves 5 which each extend in a longitudinal direction L. The two block-lock halves 5 are designed to be complementary or mirror-symmetrical in relation to one another. A crosspiece 6 is formed between the two block-lock halves 5. The crosspiece 6 separates the two accommodated openings 4 from one another. The block-lock halves 5 interengage in a comb-like manner at a respective end 7 of the block lock 1.

Figure 2:
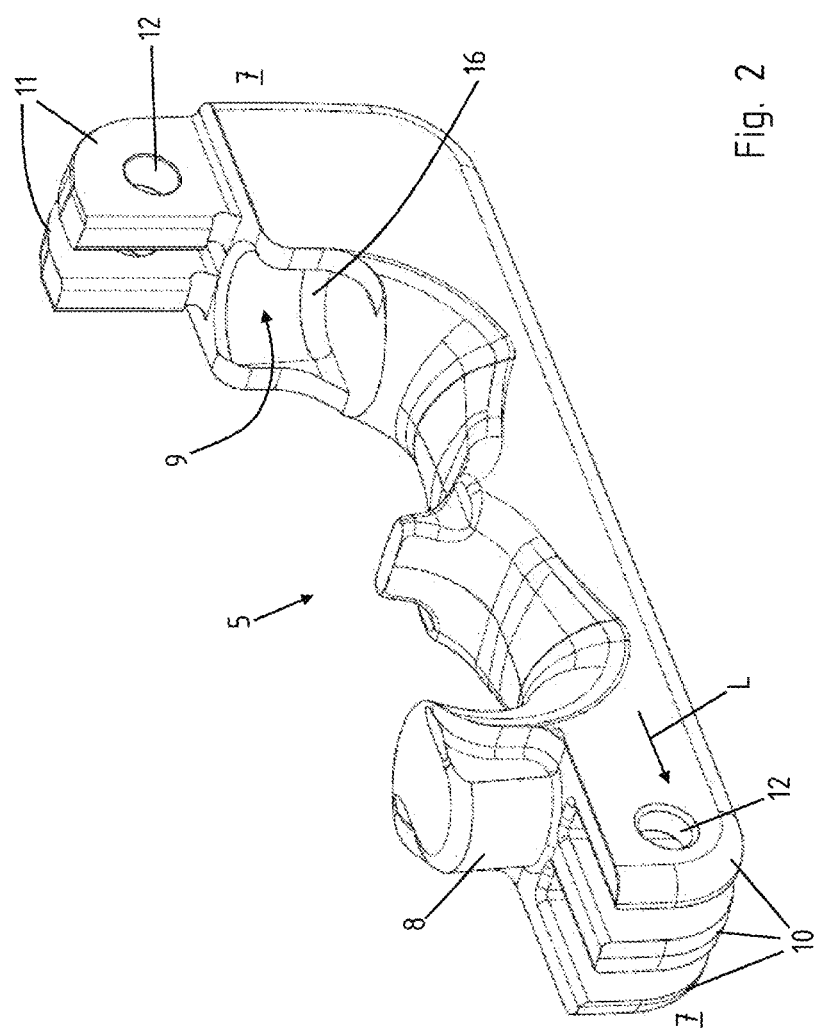
FIG. 2 shows a perspective view of a block-lock half according to disclosure.

This is able to be seen in the perspective illustration in FIG. 2. FIG. 2 shows a perspective view of one block-lock half 5. The second block-lock half (not illustrated) is designed to be mirror-symmetrical in relation thereto. For this purpose, the block-lock half 5 has a stub 8 in the region of one end 7 and a stub socket 9 at the opposite end. The block-lock half which is not illustrated, then, ends up with its stub (not illustrated) in abutment against the stub socket 9 which is illustrated here. The block-lock half which is not illustrated likewise has a stub socket, against which the stub 8 which is illustrated here likewise ends up in abutment in a form-fitting manner.

According to the disclosure, then, provision is made for three comb-like fork extensions 10 to be formed at the end 7 of the block-lock half 5 beneath the stub 8 and so as to be project in the longitudinal direction L in relation to the stub 8. The fork extensions 10 are arranged parallel to one another. Two extensions 11 are arranged parallel to one another at the opposite end 7 of the block-lock half 5. The extensions 11 are arranged behind the stub socket 9, as seen in the longitudinal direction L, in the direction of the end. They project in relation to the stub socket 9 in a direction transverse to the longitudinal direction L.

The extensions 11 of one block-lock half 5, then, engage in a comb-like manner in the fork extensions 10 of the other block-lock half. This comb-like interengagement is able to take place both in the longitudinal direction L, but also in a direction transverse to the longitudinal direction L. The displacement distance in the longitudinal direction L is therefore only defined by the slope of the stub 8 and of the stub socket 9. Furthermore, a undercut 16 is formed in a groove base of the stub socket 9. This undercut reduces the stressing which occurs in the stub socket 9 when the block lock 1 has been locked.

Figure 3:
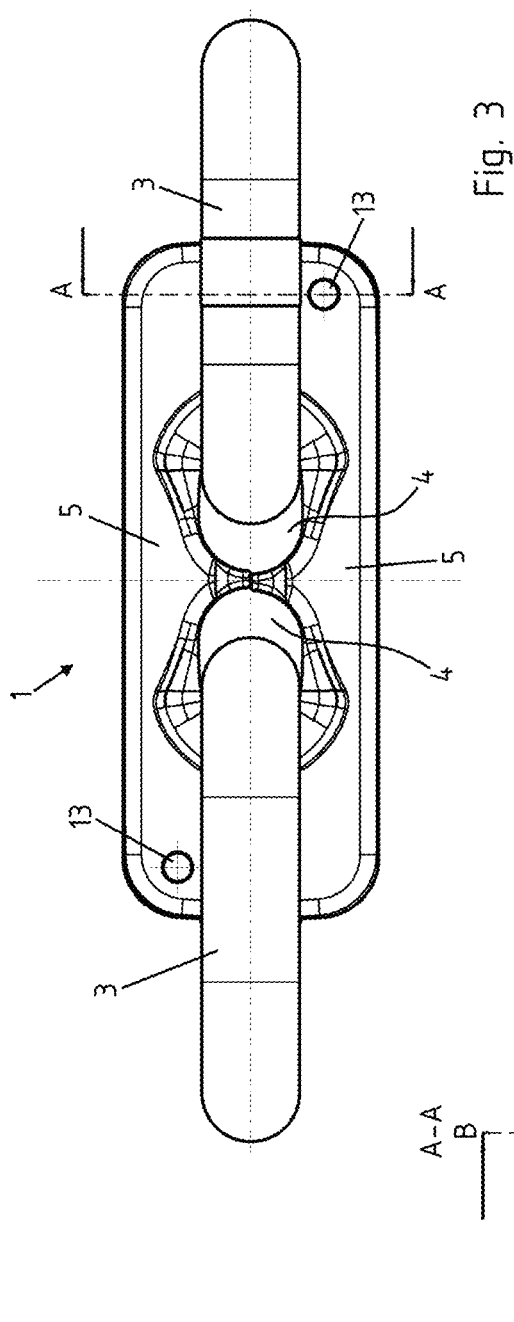
FIG. 3 shows a side view of the block lock from FIG. 1 according to disclosure.
Figure 4:
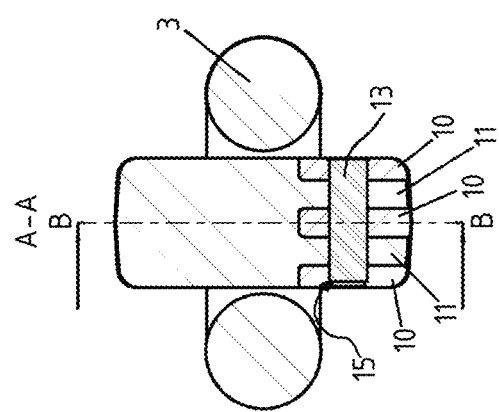
FIG. 4 shows a cross-sectional view taken along section line A-A from FIG. 3 according to disclosure.

In order to be locked to one another, the fork extensions 10 and the extensions 8 have a respective opening 12, into which a fixing means 13 is able to be inserted, such as a fixing pin illustrated in FIG. 3 to FIG. 5.

FIG. 3 shows a side view of the block lock 1 according to the disclosure in the locked state. The two block-lock halves 5 are interlocked.

According to the longitudinal-section view in FIG. 5A and the detail-specific view in FIG. 5B, this view having been taken along section line B-B from FIG. 4, the displacement distance 14 is able to be seen in the longitudinal direction L is created exclusively from the offset or the angle α of the stub 8. The angle α of the stub 8 together with the height of the stub 8, the height extending in a direction transverse to the longitudinal direction L, then gives rise to the maximum displacement distance 14 which is necessary to lock the chain lock according to the disclosure in the longitudinal direction. If the chain is subjected to a tensile force in the longitudinal direction L, then the two block-lock halves 5 push toward one another in a direction transverse to the longitudinal direction L on account of the stub 5 and stub socket 9 being arranged in an angled state in relation to one another.

FIG. 4 shows a cross-sectional view of the locked state of the comb-like interengagement of the extensions 11 and fork extensions 10 and also the introduction of a securing pin forming the fixing means 13. A stepped shoulder 15 to be formed, for example, in one fork extension 10, in which case the securing pin is able to be inserted only on one side and, as a result of the stepped shoulder 15, is not pushed out on the left-hand side, as seen in the image plane.

FIG. 5B illustrates the displacement distance 14. The latter is smaller than 10% of the diameter of the chain link 3 illustrated in FIG. 5A. The disclosure therefore also relates to a block-lock arrangement comprising the block lock and at least one chain link coupled thereto.

The foregoing description of some embodiments of the disclosure has been presented for purposes of illustration and description. The description is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. Various changes, substitutions and alterations can be made hereto without departing from the spirit and scope of the disclosure.

The invention claimed is:

1. A block lock for connecting two chain ends, comprising:
    in a locked state, two oppositely located block-lock halves which extend in a longitudinal direction of the block lock, wherein the two block-lock halves interengage in a form-fitting manner via a respective stub and stub socket, and the two block-lock halves lock to form an opening for accommodating a chain link, and the two block-lock halves each have an end, and the two block-lock halves interengage in a comb-like manner at each of the ends, and the two block-lock halves lock to one another via a displacement distance in the longitudinal direction, wherein the displacement distance is smaller than 10% of a diameter of the chain link, wherein an extended portion at one end of each of the two block-lock halves has at least three comb-like fork extensions, and wherein the at least three comb-like fork extensions externed parallel alongside each other in the longitudinal direction.

2. The block lock according to claim 1, wherein the extended portion is beneath the stub and projects in the longitudinal direction in relation to the stub.

3. The block lock according to claim 1, wherein a first extension and a second extension are formed parallel one beside the other, at another of the ends of each of the two block-lock halves.

4. The block lock according to claim 3, wherein the first extension and the second extension project in relation to the stub socket in a direction transverse to the longitudinal direction.

5. The block lock according to claim 3, wherein, in the locked state, the first extension and the second extension engage in the comb-like manner in the fork extensions.

6. The block lock according to claim 3, further comprising a securing pin able to be inserted in a form-fitting manner in a direction transverse to the longitudinal direction, with engagement through the fork extensions and the first extension and the second extension.

7. The block lock according to claim 1, wherein the two block-lock halves have mirror-symmetry in relation to one another.

8. The block lock according to claim 1, wherein the stub has a slope, which is at an angle of between 4 and 8 degrees to an orthogonal in relation to the longitudinal direction.

9. The block lock according to claim 1, wherein an undercut is in a groove base of the stub socket.

10. The block lock according to claim 1, wherein the two block-lock halves lock to form at least two accommodating openings.

11. The block lock according to claim 1, wherein the stub has a slope, which is at an angle of between 5 to 7 degrees to an orthogonal in relation to the longitudinal direction.

12. The block lock according to claim 1, wherein the stub has a slope, which is at an angle of 6 degrees to an orthogonal in relation to the longitudinal direction.

* * * * *